(12) United States Patent
Zhao et al.

(10) Patent No.: US 11,192,306 B2
(45) Date of Patent: Dec. 7, 2021

(54) BUILD LAYER TEMPERATURE CONTROL

(71) Applicant: Hewlett-Packard Development Company, L.P., Houston, TX (US)

(72) Inventors: Yan Zhao, Palo Alto, CA (US); Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 163 days.

(21) Appl. No.: 15/770,476

(22) PCT Filed: Feb. 8, 2016

(86) PCT No.: PCT/US2016/017004
§ 371 (c)(1),
(2) Date: Apr. 23, 2018

(87) PCT Pub. No.: WO2017/138915
PCT Pub. Date: Aug. 17, 2017

(65) Prior Publication Data
US 2019/0054699 A1 Feb. 21, 2019

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/165* (2017.08); *B33Y 10/00* (2014.12); *B33Y 40/00* (2014.12); *B33Y 50/02* (2014.12)

(58) Field of Classification Search
CPC ..... B29C 64/393; B29C 64/165; B33Y 40/00; B33Y 10/00; B33Y 50/02
See application file for complete search history.

(56) References Cited

U.S. PATENT DOCUMENTS 5,423,669 A 6/1995 Chapman
5,508,489 A 4/1996 Benda et al.
(Continued)

FOREIGN PATENT DOCUMENTS

EP 1466718 A2 10/2004
EP 1634694 A2 3/2006
(Continued)

OTHER PUBLICATIONS

H.C.H. Ho, et al., "Effects of Graphite Powder on the Laser Sintering Behaviour of Polycarbonate", Rapid Prototyping Journal, vol. 8, No. 4, Dec. 29, 2015, p. 1. http://www.emeraldinsight.com/doi/abs/10.1108/13552540210441148.
(Continued)

*Primary Examiner* — Timothy Kennedy
*Assistant Examiner* — Olukorede Esan
(74) *Attorney, Agent, or Firm* — Mannava & Kang

(57) ABSTRACT

Examples include an apparatus for generating a three-dimensional object. The apparatus comprises at least one energy source, at least one build layer temperature sensor, and a controller. The controller is to control the at least one energy source to pre-fuse a portion of a build layer in a build area when a build layer temperature is less than a first temperature threshold. The controller is further to, after pre-fusing the portion of the build layer, control the at least one energy source to fuse the portion of the build layer in the build area when the build layer temperature is less than a second threshold.

18 Claims, 10 Drawing Sheets

(51) Int. Cl.
    *B29C 64/165*    (2017.01)
    *B33Y 10/00*     (2015.01)
    *B33Y 40/00*     (2020.01)

(56) References Cited

U.S. PATENT DOCUMENTS

| | | | |
|---|---|---|---|
| 6,815,636 | B2 | 11/2004 | Chung et al. |
| 7,537,722 | B2 | 5/2009 | Andersson et al. |
| 2002/0105114 | A1* | 8/2002 | Kubo .................... B29C 64/153 264/497 |
| 2004/0200816 | A1* | 10/2004 | Chung ............... G05D 23/1919 219/121.83 |
| 2005/0023719 | A1* | 2/2005 | Nielsen .................. B29C 64/40 264/162 |
| 2006/0180957 | A1* | 8/2006 | Hopkinson ............. B29C 67/02 264/405 |
| 2015/0088295 | A1 | 3/2015 | Hellestam |
| 2015/0158111 | A1* | 6/2015 | Schwarze .............. B33Y 30/00 219/121.34 |
| 2015/0165524 | A1* | 6/2015 | Ljungblad ............... C01B 3/025 419/53 |
| 2015/0190966 | A1 | 7/2015 | Griszbacher et al. |

FOREIGN PATENT DOCUMENTS

| | | |
|---|---|---|
| TW | 201607740 | 3/2016 |
| WO | WO-2014/144255 A2 | 9/2014 |
| WO | WO-2015/108547 A2 | 7/2015 |
| WO | WO-2015106838 A1 | 7/2015 |
| WO | WO-2016/010536 A1 | 1/2016 |

OTHER PUBLICATIONS

International Search Report and Written Opinion dated Dec. 7, 2016, PCT Patent Application No. PCT/US2016/017004, filed Feb. 8, 2016, Korean Intellectual Property Office.

* cited by examiner

BUILD LAYER TEMPERATURE CONTROL

CLAIM FOR PRIORITY

The present application is a national stage filing under 35 U.S.C. § 371 of PCT application number PCT/US2016/017004, having an international filing date of Feb. 8, 2016, the disclosure of which is hereby incorporated by reference in its entirety.

BACKGROUND

Additive manufacturing systems that generate three-dimensional objects on a layer-by-layer basis are convenient way for producing three-dimensional objects. Examples of additive manufacturing systems include three-dimensional printing systems. The quality of objects produced by additive manufacturing systems may vary widely based on the type of additive manufacturing technology used.

DRAWINGS

Figure 1:
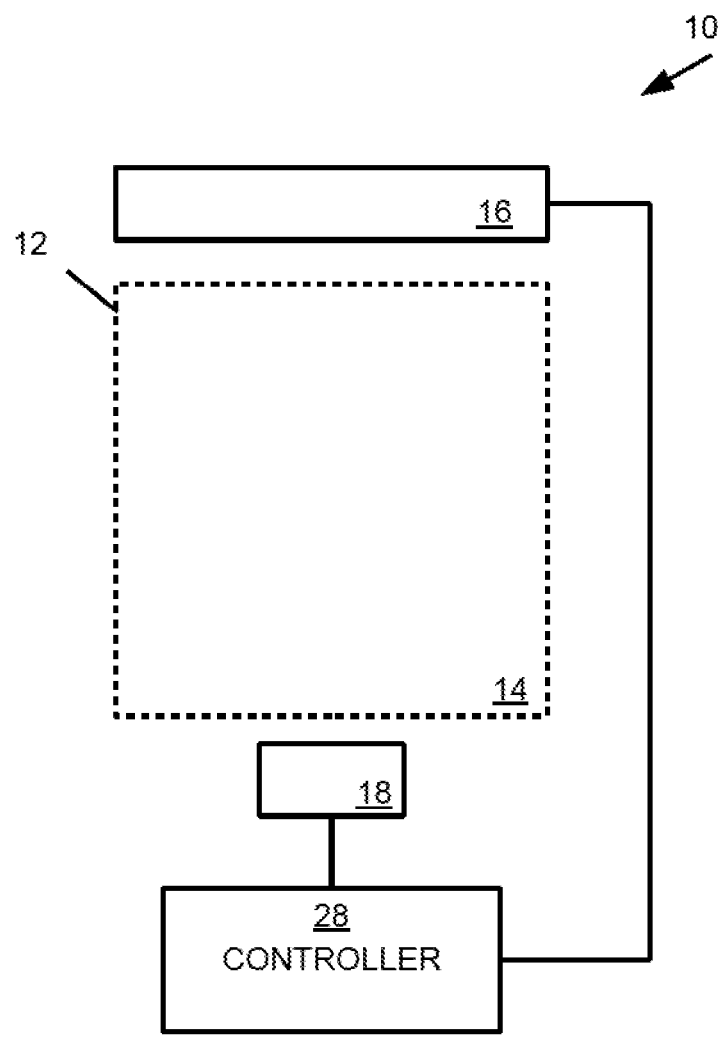

FIG. 1 provides a block diagram of some components of an example apparatus for generating three-dimensional objects.

Figure 2A:
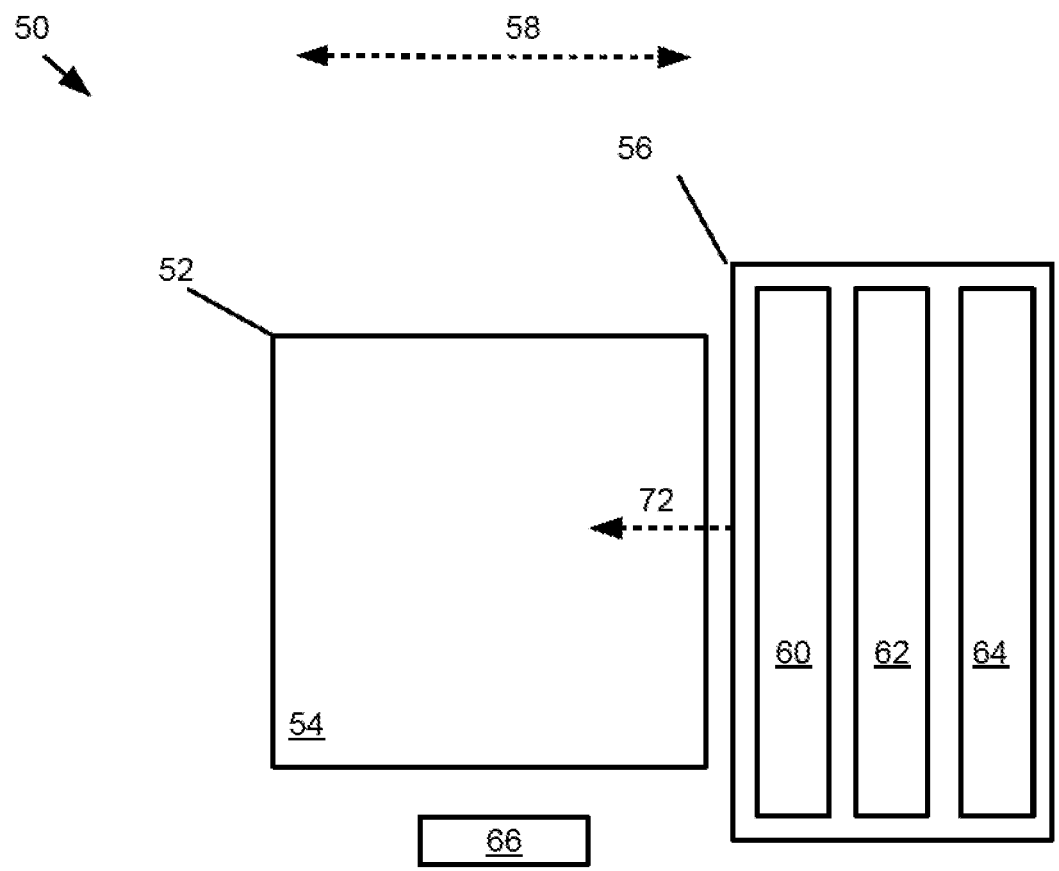
Figure 2B:
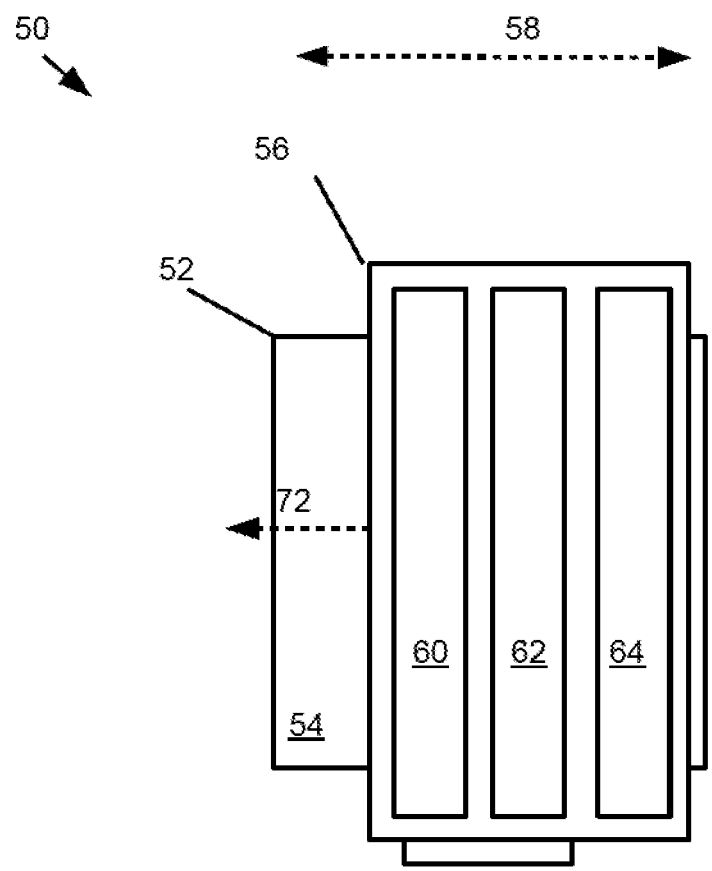
Figure 2C:
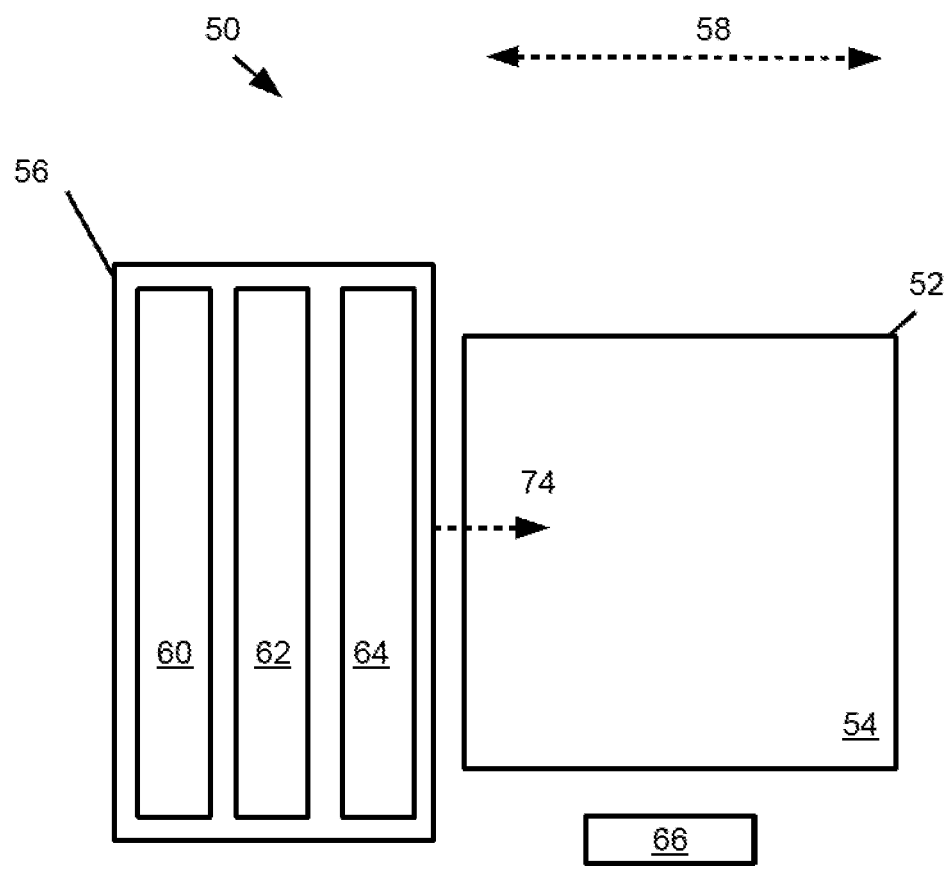

FIGS. 2A-C provide block diagrams of some components of an example apparatus for generating three-dimensional objects.

Figure 3:
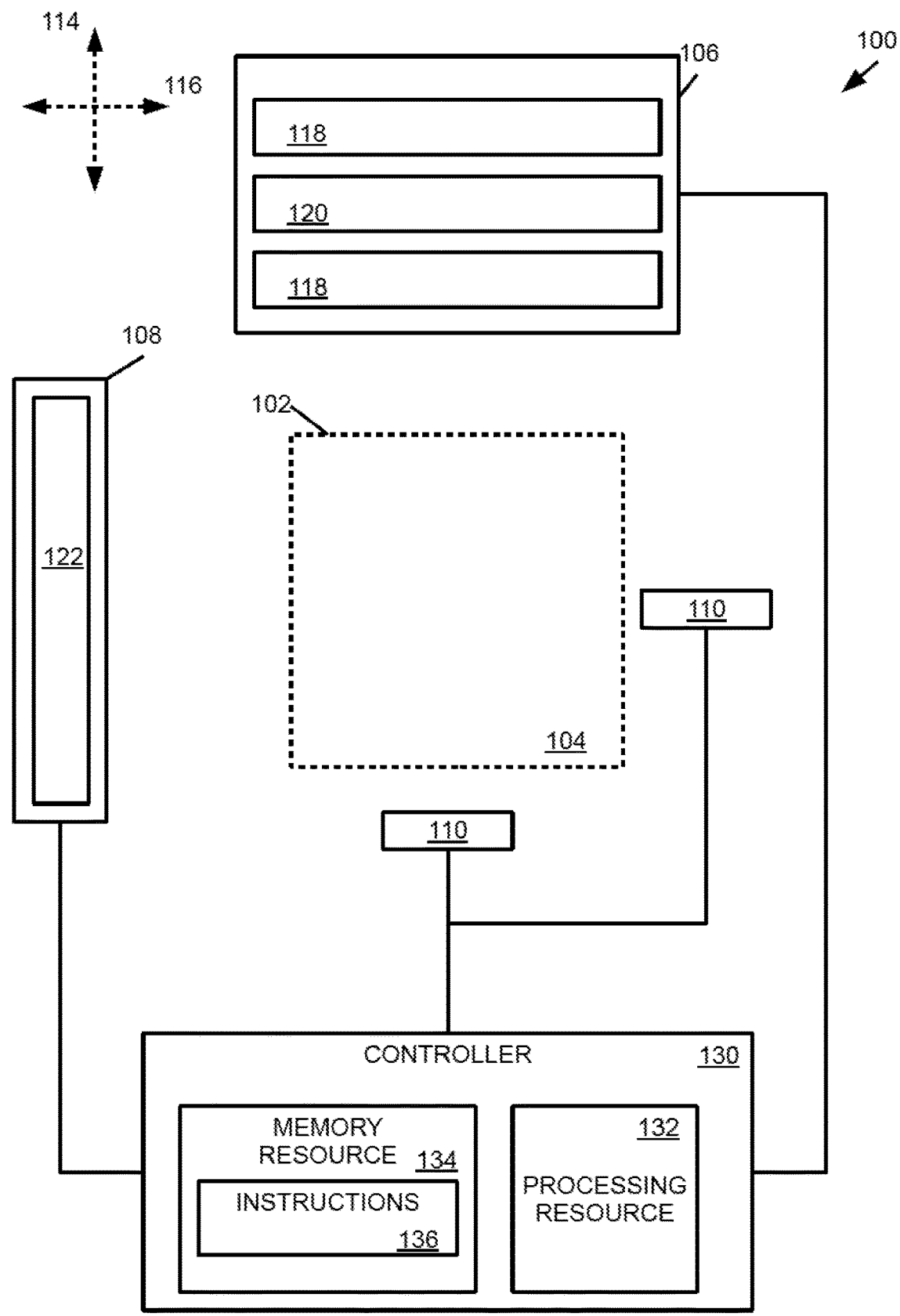

FIG. 3 provides a block diagram of some components of an example apparatus for generating three-dimensional objects.

Figure 4:
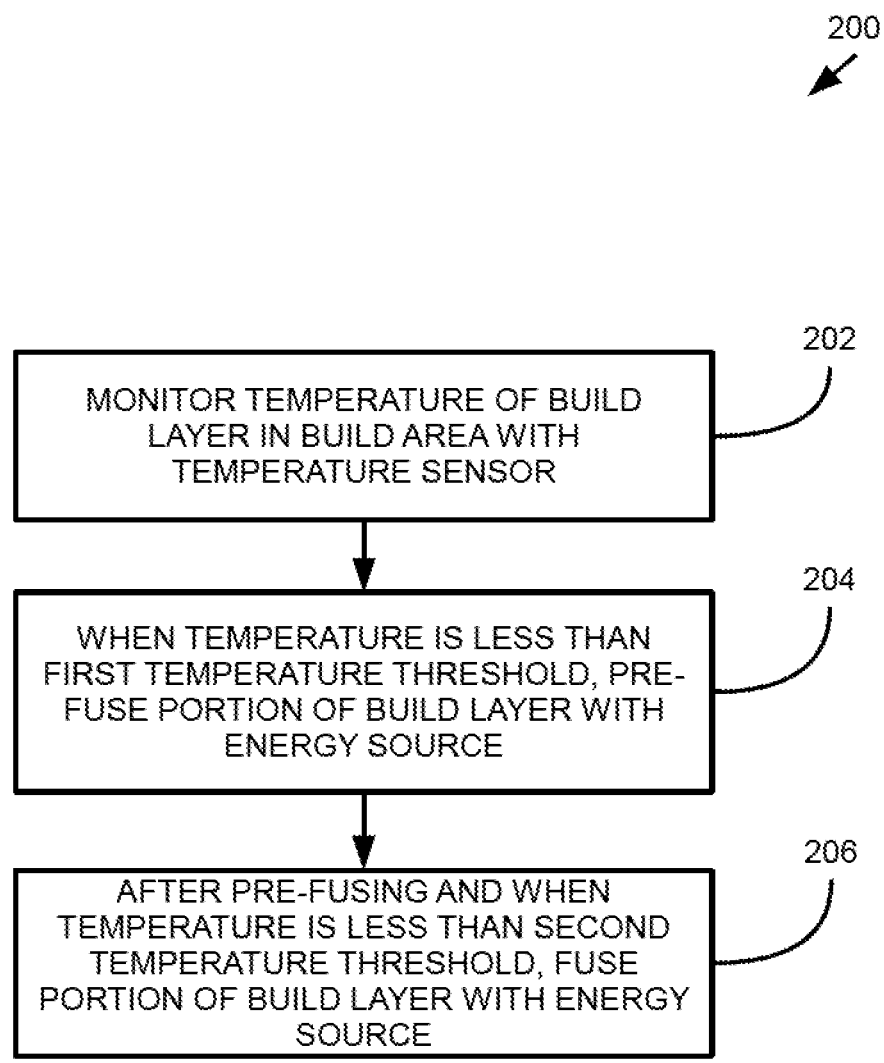

FIG. 4 provides a flowchart that illustrates a sequence of operations that may be performed by an example apparatus.

Figure 5:
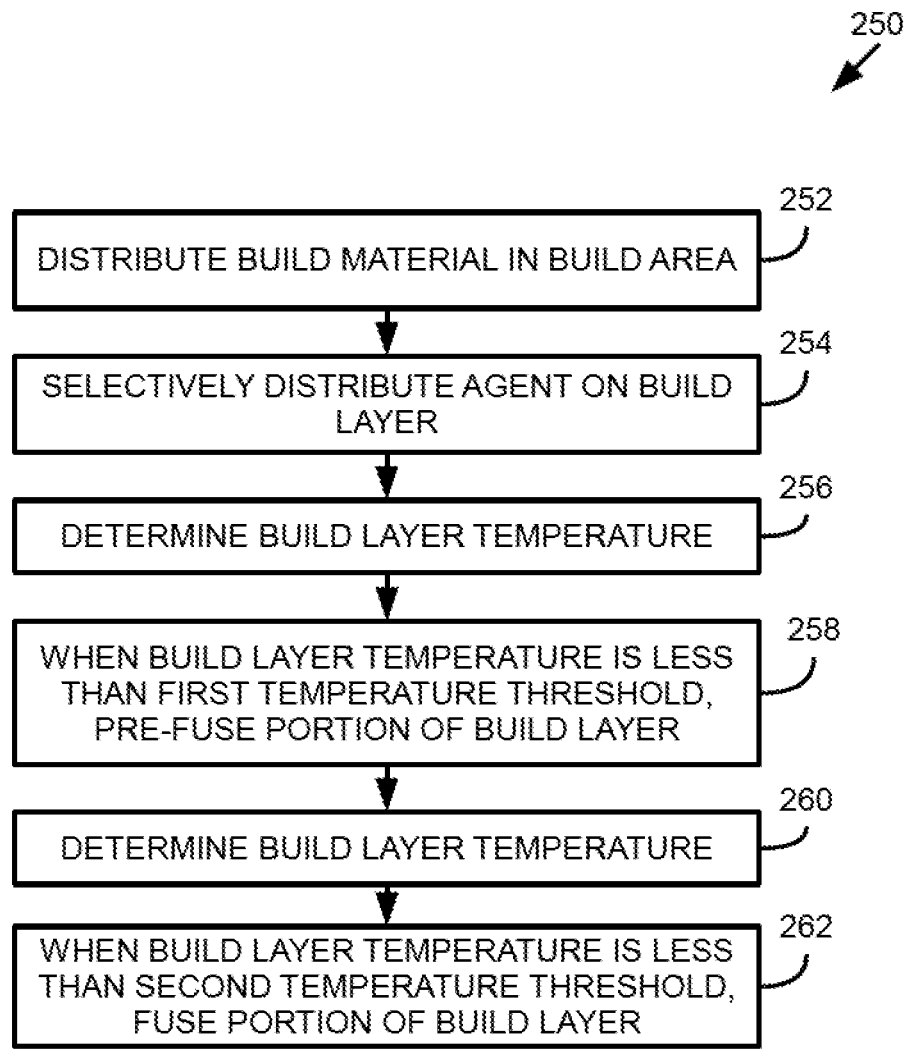

FIG. 5 provides a flowchart that illustrates a sequence of operations that may be performed by an example apparatus.

Figure 6:
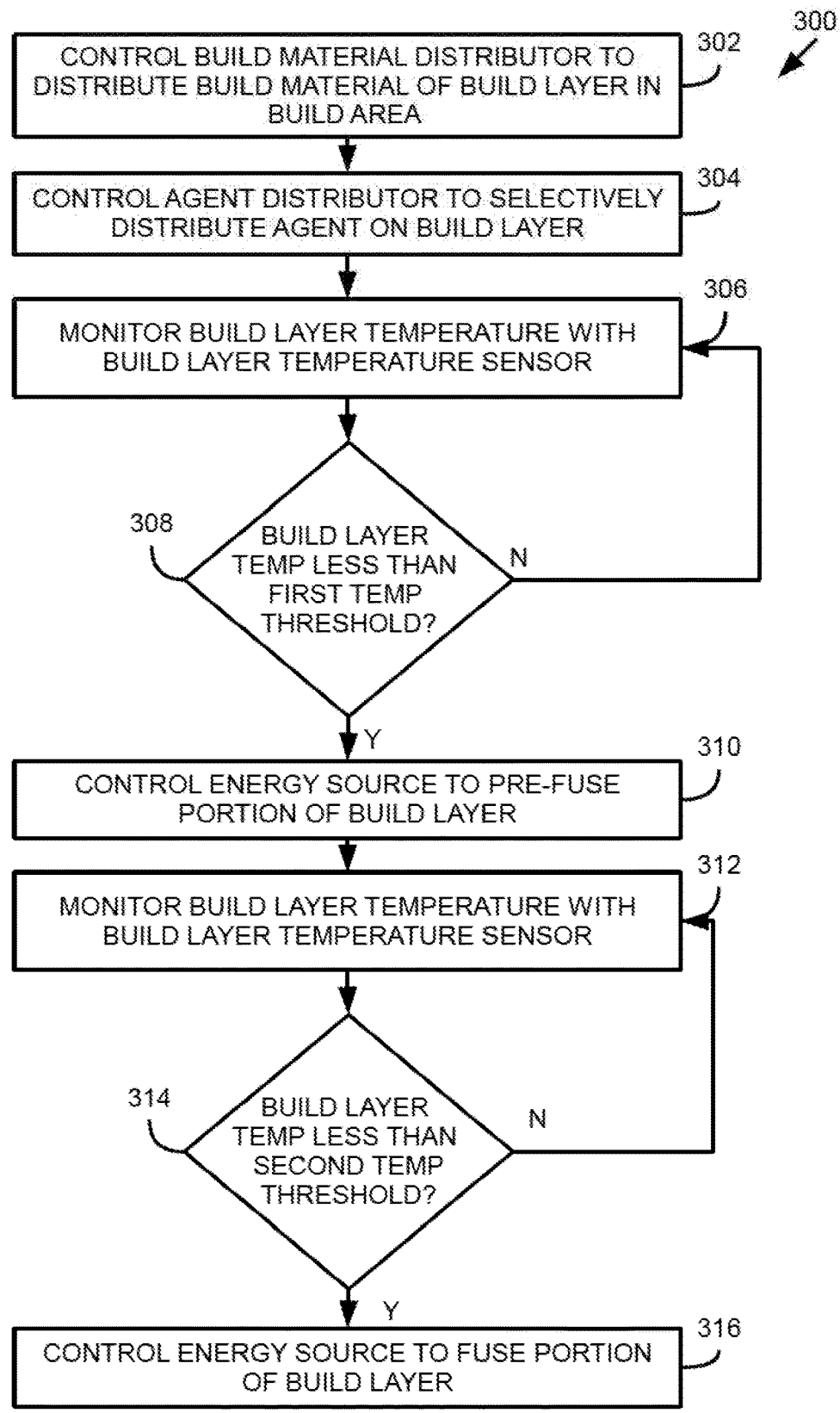

FIG. 6 provides a flowchart that illustrates a sequence of operations that may be performed by an example apparatus.

Figure 7A:
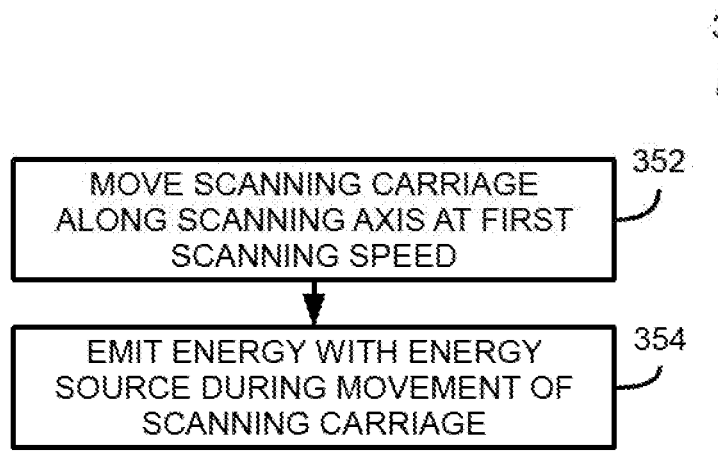
Figure 7B:
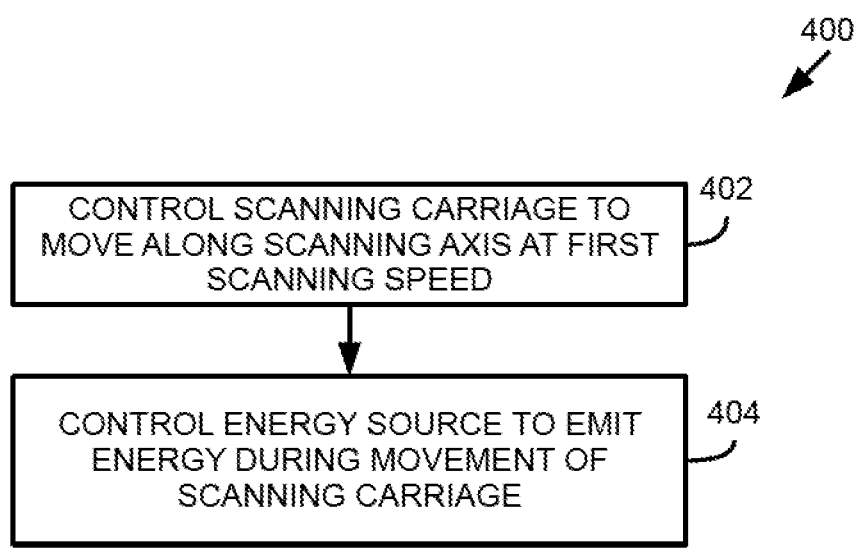

FIGS. 7A-B provide flowcharts that illustrate sequences of operations that may be performed by an example apparatus.

Figure 8A:
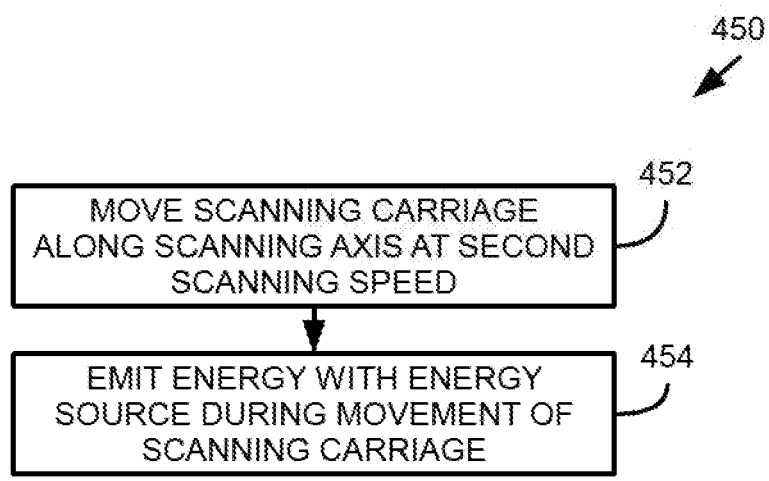
Figure 8B:
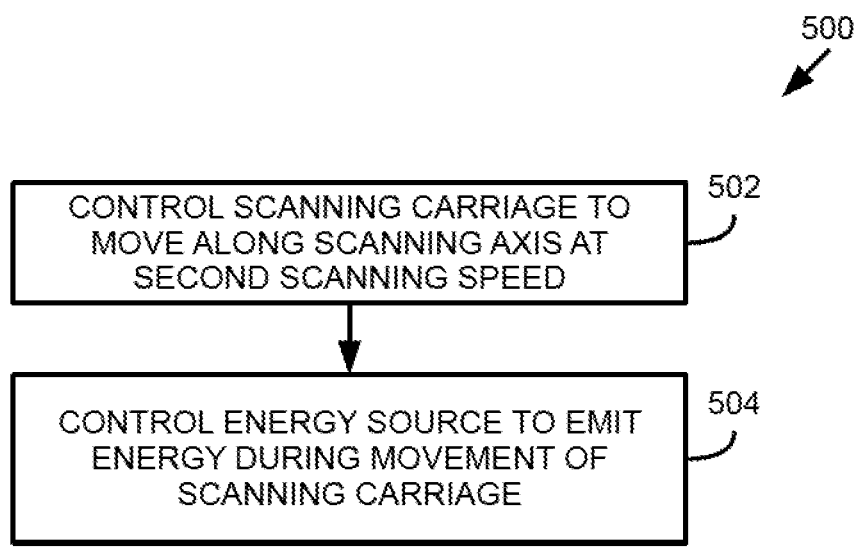

FIGS. 8A-B provide flowcharts that illustrate sequences of operations that may be performed by an example apparatus.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DESCRIPTION

Examples provided herein include apparatuses and processes for generating three-dimensional objects. Apparatuses for generating three-dimensional objects may be referred to as additive manufacturing apparatuses and additive manufacturing processes. As will be appreciated, example apparatuses described herein may correspond to three-dimensional printing systems, which may also be referred to as three-dimensional printers. In an example additive manufacturing process, a layer of build material may be distributed in a build area of a build material support, an agent may be selectively distributed on the layer of build material, and energy may be temporarily applied to the layer of build material. As used herein, a build layer may refer to a layer of build material distributed in a build area upon which agent may be distributed and/or energy may be applied.

The application of energy may cause portions of the layer of build material to which agent has been applied to begin to coalesce. In contrast, build material upon which agent was not distributed may not coalesce due to the application of energy. In some examples, energy may be applied to a build layer with at least one energy source of an example apparatus. Examples of energy sources may comprise a heating element, electromagnetic radiation emitter (e.g., light emitter, infrared emitter, ultraviolet emitter, laser emitter, etc.), and/or a lamp (e.g., a halogen lamp).

An initial application of energy may cause portions of the build layer to coalesce, such initial application of energy may be referred to as pre-fusing. Approximately complete coalescing of build material may be referred to as fusing. The temperature at which portions of the layer of build material may begin to coalesce may be referred to as a fusing temperature. As will be appreciated, the difference between pre-fusing and fusing may be based at least in part on an amount/intensity of energy applied and/or a duration of time in which energy is applied. Upon cooling, portions of the build material layer that have coalesced become solid and form part of a three-dimensional object being generated. Accordingly, the portions of the build material layer upon which agent is selectively distributed (and which become solid) may be referred to as the "part area" of the build layer.

Additional layers may be distributed and the operations described above may be performed for each layer to thereby generate a three-dimensional object. As will be appreciated, each layer may correspond to a cross-section of a three-dimensional object to be formed. Sequentially layering and fusing portions of layers of build material on top of previous layers may facilitate generation of the three-dimensional object. The layer-by-layer formation of a three-dimensional object may be referred to as a layer-wise additive manufacturing process. In some examples, a height of a build layer (which may also be referred to as thickness) may be in the micron scale. For example, some example build layer heights may be in the range of approximately 60 to 150 microns. Furthermore, an overall build height of the cumulative layers of build material may be in the centimeter or meter scale depending on the apparatus and process implemented.

In examples described herein, a build material may include a powder-based build material, where powder-based build material may comprise wet and/or dry powder-based materials, particulate materials, and/or granular materials. In some examples, the build material may be a weak light absorbing polymer. In some examples, the build material may be a thermoplastic. Furthermore, as described herein, agent may comprise fluids that may facilitate fusing of build material when energy is applied. In some examples, agent may be referred to as coalescing agent. In some examples, agent may be a light absorbing fluid, such as a pigment colorant.

As will be appreciated, various types of build materials may have differing material properties. Performance of various operations of a layer-wise additive manufacturing process as described herein may be based at least in part on material properties of a build material used in such process. Example material properties may include critical temperature, emissivity, absorbance, thermal conductivity, thermal diffusivity, thermal expansion, photosensitivity, reflectivity, melting point, coefficient of thermal expansion, plasticity, elasticity, permeability, reactivity, surface energy, electrical conductivity, permittivity, and/or other such material properties.

In some examples of apparatuses for generating three-dimensional objects, a temperature of a build layer during pre-fusing and/or fusing may affect overall quality and material/mechanical strength of a generated three-dimensional object. Furthermore, quality of three-dimensional objects generated by an apparatus may be based at least in part on selectivity of an apparatus. Selectivity of an apparatus may refer to a characteristic that corresponds to the ability of the apparatus to apply energy to portions of a build layer that will be used to form the object and the ability of the apparatus to not apply energy to portions of the build layer that will not be used to form the object.

Example apparatuses comprise at least one build layer temperature sensor with which to determine a build layer temperature of a layer of build material distributed in a build area of the apparatus. Examples of a build layer temperature sensor may comprise an infrared temperature sensor, a thermal vision sensor, infrared camera, and/or other types of sensors that may be used to determine a temperature of a build layer.

In examples, at least one energy source may be controlled for the pre-fusing and/or fusing of the build layer based at least in part on a temperature of the build layer. In some examples, an energy source may be operated to pre-fuse a build layer when a build layer temperature is less than a first temperature threshold. In such examples, the first temperature threshold may correspond to control of a cooling time—if the temperature of the build layer is greater than the threshold, the apparatus may wait until the temperature of the build layer cools to the first temperature threshold. In some examples, the first temperature threshold may be referred to as a pre-fusing temperature threshold. As will be appreciated, when the build layer cools to the pre-fusing temperature threshold, an apparatus may initiate performance of operations to perform pre-fusing on the build layer. Furthermore, the first temperature threshold may be based at least in part on material properties of build material implemented in the layer-wise additive manufacturing process. Accordingly, the first temperature threshold (i.e., a pre-fusing temperature threshold) may vary based on the build material used by an apparatus. In some examples, the first temperature threshold may be in a range from approximately 60° Celsius to approximately 100° Celsius. In some examples, the first temperature threshold may be in a range from approximately 80° Celsius to approximately 90° Celsius. However, it will be appreciated that in other examples the first temperature threshold may be greater than or less than the approximate temperature values of the example ranges.

In addition, after pre-fusing the build layer, the energy source may be operated to fuse the build layer when the build layer temperature is less than a second temperature threshold. In such examples, the second temperature threshold may correspond to control of a cooling time after pre-fusing a build layer—if the temperature of the build layer, after pre-fusing, is greater than the second temperature threshold, the apparatus may wait until the temperature of the build layer cools to the second temperature threshold. In some examples, the second temperature threshold may be referred to as a fusing temperature threshold. As will be appreciated, when the build layer cools to the fusing temperature threshold, an apparatus may initiate performance of operations to perform fusing on the build layer. Furthermore, the second temperature threshold may be based at least in part on material properties of build material implemented in the layer-wise additive manufacturing process. Accordingly, the second temperature threshold (i.e., a fusing temperature threshold) may vary based on the build material used by an apparatus. In some examples, the second temperature threshold may be in a range from approximately 70° Celsius to approximately 110° Celsius. In some examples, the second temperature threshold may be in a range from approximately 85° Celsius to approximately 100° Celsius. However, it will be appreciated that in other examples the second temperature threshold may be greater than or less than the approximate temperature values of the example ranges. As used herein, "approximately," when used with regard to a value, may correspond to a range of ±10%.

Therefore, some examples may coordinate the performance of various operations of an additive manufacturing process based on temperature of a build layer. As will be appreciated, in some examples, performance of operations of an additive manufacturing process may be delayed until build layer temperature is less than specified thresholds. In these examples, by waiting until the build layer is less than a defined temperature threshold, examples may implement passive cooling in a layer-wise additive manufacturing process. In such examples, coordinating performance of operations of a layer-wise additive manufacturing process based at least in part on build layer temperature may improve selectivity of the apparatus in performing the layer-wise additive manufacturing process. In addition, coordinating performance of operations of a layer-wise additive manufacturing process based at least in part on build layer temperature may reduce thermal bleeding into undesired areas of the build layer, where such thermal bleeding may result in build material waste and less accurate object dimensions.

In some examples, an apparatus may comprise a build material support, where a surface of the build material support may correspond to a build area. Accordingly, a first layer of build material may be distributed on the surface of the build material support in the build area. Subsequent layers of build material may be distributed in the build area on previously distributed and fused layers. Furthermore, apparatuses may comprise energy sources with which to temporarily apply energy to build material layers to heat the build material layers to thereby pre-fuse or fuse the build material layers. For example, an apparatus may comprise at least one energy source that may heat a build material layer such that portions of the build material layer where agent has been distributed may pre-fuse and/or fuse. In some examples, apparatuses may further comprise additional energy sources with which to preheat build material layers.

In addition, example apparatus may comprise an agent distributor coupled to a scanning carriage. In some examples, an agent distributor may comprise a printhead or printheads (e.g., a thermal ejection based printhead, a piezo-electric ejection based printhead, etc.). In one example, printheads suitable for implementation in commercially available inkjet printing devices may be implemented as an agent distributor. In other examples, an agent distributor may comprise other types of fluid ejection devices that selectively eject small volumes of fluid. In some examples, an agent distributor may comprise at least one printhead that comprises a plurality of fluid ejection dies arranged generally end-to-end along a width of the agent distributor. In some examples, the at least one printhead may comprise a plurality of printheads arranged generally end-to-end along a width of the agent distributor. In such examples, a width of the agent distributor may correspond to a dimension of a build area. For example, a width of the agent distributor may correspond to a width of a build area.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may distribute build material in the build area as the scanning carriage moves over the build area along the scanning axis to thereby distribute a layer of build material in the build area.

Turning now to the figures, and particularly to FIG. 1, this figure provides a block diagram of some components of an example apparatus 10 for generating a three-dimensional object. In this example, the apparatus 10 may comprise a build material support 12 having a surface that corresponds to a build area 14. As will be appreciated, layers of build material may be distributed in the build area 14 on the surface of the build material support 12. Furthermore, in this example, the apparatus 10 comprises at least one energy source 16 to apply energy to a build layer in the build area 14. The apparatus 10 further comprises at least one build layer temperature sensor 18 to measure a build layer temperature of a build layer in the build area 14. The apparatus 10 further comprises a controller 28 connected to the energy source 16 and the build layer temperature sensor 18.

A controller, such as the controller 28 of the example apparatus 10, may comprise a processing resource and/or a memory resource. A processing resource may comprise one or more general purpose data processors and/or one or more specialized data processors. For example, a processing resource may comprise a central processing unit (CPU), a graphics processing unit (GPU), an application-specific integrated circuit (ASIC), a controller, and/or other such configurations of logical components for data processing.

A memory resource may comprise random access memory (RAM) devices as well as other types of memory (e.g. cache memories, non-volatile memory devices, read-only memories, mass-storage resources, etc.). As will be appreciated, a memory resource may be a computer readable and/or machine-readable storage medium (e.g., RAM, ROM, erasable programmable read-only memory (EPROM), electrically erasable programmable read-only memory, flash memory or other solid state memory technology, portable compact disc memory, or other optical storage, or any other medium that may be used to store executable instructions and information).

Therefore, as described herein, a controller may be any combination of hardware and programming to implement the functionalities described with respect to a controller and/or a method. In some examples described herein, the combinations of hardware and programming may be implemented in a number of different ways. For example, the programming for the controller may be processor executable instructions stored on a non-transitory machine-readable storage medium and the hardware for the controller may include a processing resource to execute those instructions. In these examples, an apparatus implementing such controller may include the machine-readable storage medium storing the instructions and the processing resource to execute the instructions, or the machine-readable storage medium may be separately stored and accessible by the apparatus and the controller. In some examples, a controller may be implemented in circuitry.

In the example apparatus 10 of FIG. 1, the controller 28 may control the at least one energy source 16. In addition, the controller 28 may be connected to the build layer temperature sensor 18 and receive sensor data from the build layer temperature sensor 18. The sensor data may be processed by the controller 28 to determine a build layer temperature of a build layer distributed in the build area 14. In this example, the controller 28 may control operation of the at least one energy source 16 based at least in part on a build layer temperature determined from the sensor data received from the build layer temperature sensor 18. For example, the controller 28 may control the at least one energy source 16 to pre-fuse a portion of a build layer in the build area 14 when the build layer temperature is less than a first temperature threshold. As another example, after pre-fusing the portion of the build layer, the controller 28 may control the at least one energy source 16 to fuse the portion of the build layer in the build area 14 when the build layer temperature is less than a second temperature threshold.

Accordingly, in some examples, a first layer of build material may be distributed on the surface of the build material support 12 in the corresponding build area 14, and agent may be selectively distributed on the first layer of build material. The controller 28 may control the at least one energy source 16 to pre-fuse and/or fuse the first layer of build material by controlled application of energy to the first build layer based at least in part on the build layer temperature determined with sensor data received from the build layer temperature sensor 18. After fusing the first layer of build material, additional layers of build material may be sequentially distributed and fused on top of each previous layer in the build area 14. For each sequential layer, the example may control operation of the at least one energy source 16 based at least in part on a build layer temperature determined for the sequential layer. Therefore, the build area 14 refers to the area corresponding to the surface of the build material support 12 in which layers of build material may be distributed and fused in a layer-wise additive manufacturing process. Furthermore, the example apparatus 10 controls performance of various operations associated with a layer-wise additive manufacturing process based on a build layer temperature for a top-most layer of build material.

FIGS. 2A-C provide block diagrams that illustrate some components of an example apparatus 50. In this example, the apparatus 50 comprises a build material support 52 having a surface that corresponds to a build area 54 in which layers of build material may be deposited and fused in a layer-wise additive manufacturing process to form a three-dimensional object. In this example, the apparatus 50 comprises a scanning carriage 56 that may move bi-directionally along a scanning axis 58. In this example, the apparatus 50 includes a build material distributor 60, at least one energy source 62, and an agent distributor 64 coupled to the scanning carriage 56. Accordingly, the build material distributor 60, the at least one energy source 62, and the agent distributor may move over the build area along the scanning axis 58 concurrent with movement of the scanning carriage 56.

As shown, a width of the build material distributor 60, at least one energy source 62, and the agent distributor may generally correspond to a width of the build area 54. Furthermore, the width of the build material distributor 60, the at least one energy source 62, and the agent distributor may be approximately orthogonal to the scanning axis 58. Accordingly, as the scanning carriage 56 moves along the scanning axis 58 over the build area 54, the build material distributor 60, the at least one energy source 62, and/or the agent distributor 64 may perform operations associated with a layer-wise additive manufacturing process along a scan line that is approximately orthogonal to the scanning axis 58.

In addition, the apparatus 50 comprises at least one build layer temperature sensor 66. In such examples, a build layer temperature of a build layer in the build area 54 may be determined based at least in part on sensor data generated by the build layer temperature sensor 66. Therefore in this example, the apparatus 50 may coordinate operations to be performed by the build material distributor 60, the at least one energy source 62, and/or the agent distributor 64 based at least in part on sensor data generated by the build layer temperature sensor 66. For example, the apparatus may operate the scanning carriage 56 and the at least one energy source to pre-fuse a build layer when the build layer temperature is determined to be less than a first temperature threshold. As another example, after pre-fusing the build layer, the apparatus may operate the scanning carriage 56 and the at least one energy source to fuse a build layer when the build layer temperature is determined to be less than a second temperature threshold.

FIGS. 2A-C provide examples of the bi-directional movement of the scanning carriage 56 along the scanning axis 58 between a first station (e.g., the position of the scanning carriage 56 in FIG. 2A) and a second station (e.g., the position of the scanning carriage in FIG. 2C) during performance of operations associated with a layer-wise additive manufacturing process. As shown, in FIGS. 2A and 2B, the scanning carriage 56 moves along the scanning axis 58 in a first direction 72 over the build area 54 from the first station towards the second station. In FIG. 2C, the scanning carriage 56 has reached the second station and is moving in a second direction 74 along the scanning axis 58 from the second station towards the first station.

FIG. 3 provides a block diagram that illustrates some components of an example apparatus 100 for generating a three-dimensional object. In this example, the apparatus 100 may comprise a build material support 102. As will be appreciated, in some examples, the build material support 102 may not be included in the apparatus 100; hence, the build material support 102 is illustrated in dashed line. As discussed previously, the build material support 102 may have a build surface that corresponds to a build area 104 in which layers of build material may be sequentially distributed and fused.

The example apparatus 100 comprises a first scanning carriage 106 and a second scanning carriage 108. In addition, the apparatus 100 includes build layer temperature sensors 110. In this example, the first scanning carriage 106 may move over the build area 104 along a first scanning axis 114, and the second scanning carriage 108 may move over the build area 104 along a second scanning axis 116. As will be appreciated, the first scanning axis 114 is approximately orthogonal to the second scanning axis 116. Furthermore, the first scanning axis 114 and the second scanning axis 116 are approximately parallel to a plane of the surface of the build material support 102.

The apparatus 100 comprises energy sources 118 and a build material distributor 120 coupled to the first scanning carriage 106. Accordingly, as the first scanning carriage 106 moves along the first scanning axis 114, the apparatus 100 may distribute a layer of build material in the build area 104 with the build material distributor 120. Similarly, as the first scanning carriage 106 moves bi-directionally along the first scanning axis 114, the apparatus 100 may emit energy via the energy sources 118 to pre-fuse a build layer in the build area 104 or fuse a build layer in the build area 104.

The apparatus 100 comprises an agent distributor 122 coupled to the second scanning carriage 108. Accordingly, as the second scanning carriage moves along the second scanning axis 116, the apparatus may selectively distribute agent on a build layer in the build area 104 with the agent distributor 122. As will be appreciated, the example arrangement of the agent distributor 122, energy sources 118, and/or build material distributor 120 may be different in other examples. In another example, a build material distributor and an agent distributor may be coupled to a common scanning carriage. Other examples may comprise other arrangements.

As shown, the apparatus 100 further comprises a controller 130, where the controller is connected to the first scanning carriage 106, the second scanning carriage 108, the build layer temperature sensors 110, the energy sources 118, the build material distributor 120, and the agent distributor 122. Therefore, the controller 130 may receive sensor data from the build layer temperature sensors 110, and the controller 130 may control operation of the first scanning carriage 106, the second scanning carriage 108, the build layer temperature sensors 110, the energy sources 118, the build material distributor 120, and the agent distributor 122.

As shown, the controller 130 comprises at least one processing resource 132 and a memory resource 134. As discussed previously, the processing resource 132 may comprise a data processor, CPU, ASIC, or other such arrangements of logical components for processing data. Furthermore, the memory resource 134 may comprise a machine-readable storage medium. The memory resource 136 comprises instructions 136, where the instructions 136 are executable by the processing resource 132. Execution of the instructions 136 may cause the processing resource 132 and/or apparatus 100 to perform the functionalities, processes, and/or sequences of operations described herein.

For example, execution of the instructions 136 by the processing resource 132 may control movement of the scanning carriages 106, 108. As another example, execution of the instructions 136 may cause the build layer temperature sensors 110 to generate sensor data associated with a build layer. Execution of the instructions 136 may cause the controller 130 to control the energy sources 118 to emit energy during movement of the first scanning carriage 106 to pre-fuse a build layer.

FIGS. 4-8B provide flowcharts that provide example sequences of operations that may be performed by an example apparatus to perform example processes and methods as described herein. In some examples, some operations included in the flowcharts may be embodied in a memory (such as the memory resource 136 of FIG. 3) in the form of instructions that may be executable by a processing resource to cause an apparatus and/or controller to perform the operations corresponding to the instructions. Additionally, the examples provided in FIGS. 4-8B may be embodied in computing devices, machine-readable storage mediums, processes, and/or methods. In some examples, the example processes and/or methods disclosed in the flowcharts of FIGS. 4-8B may be performed by a controller implemented in an apparatus.

FIG. 4 is a flowchart 200 that illustrates an example sequence of operations that may be performed by an example apparatus for generating a three-dimensional object. In this example, a build layer temperature of a build layer in a build area of the apparatus may be monitored with a build layer temperature sensor (block 202). When the temperature is less than a first temperature threshold, the apparatus may pre-fuse a portion of the build layer with at least one energy source (block 204). After pre-fusing the portion of the build layer and when the build layer temperature is less than a second temperature threshold, the apparatus may fuse the portion of the build layer with the at least one energy source (block 206).

FIG. 5 is a flowchart 250 that illustrates an example sequence of operations that may be performed by an example apparatus for generating a three-dimensional object. In this example, a layer of build material may be distributed in a build area of the apparatus (block 252). Agent may be selectively distributed on the layer of build material (block 254). A build layer temperature of the build layer may be determined (block 256). As will be appreciated, the build layer temperature may be monitored to determine when the build layer temperature is less than a first temperature threshold. When the build layer temperature is less than the first temperature threshold, the apparatus may pre-fuse a portion of the build layer (block 258). After pre-fusing the portion of the build layer, the build layer temperature may be determined (block 260). In these examples, the build layer temperature may be monitored to determine when the build layer temperature is less than a second temperature threshold. When the build layer temperature is less than the second temperature threshold, the apparatus may fuse the portion of the build layer (block 262). As will be appreciated, the operations described with respect to flowchart 250 may be repeated for a plurality of build layers to thereby form a three-dimensional object.

FIG. 6 provides a flowchart 300 that illustrates an example sequence of operations that may be performed by a controller of an example apparatus for generating a three-dimensional object. In this example, the controller controls a build material distributor of the apparatus to thereby distributed build material of a build layer in a build area of the apparatus (block 302). The controller controls an agent distributor of the apparatus to selectively distribute agent on the build layer (block 304). As discussed, the agent distributor may distribute agent on a portion of the build layer that corresponds to a part area for the three-dimensional object to be generated.

The controller monitors a build layer temperature with a build layer temperature sensor (block 306) to determine when the build layer temperature is less than a first temperature threshold (block 308). While the build layer temperature is greater than the first temperature threshold ("N" branch of block 308), the controller continues monitoring the build layer temperature (block 306). In response to determining that the build layer temperature is less than the first temperature threshold ("Y" branch of block 308), the controller controls at least one energy source to pre-fuse the portion of the build layer upon which agent was selectively distributed (block 310).

After controlling the at least one energy source to pre-fuse the portion of the build layer, the controller monitors the build layer temperature with the build layer temperature sensor (block 312) to determine when the build layer temperature is less than a second temperature threshold (block 314). While the build layer temperature is greater than the second temperature threshold ("N" branch of block 314), the controller continues monitoring the build layer temperature with the build layer temperature sensor (block 312). In response to determining that the build layer temperature is less than the second temperature threshold ("Y" branch of block 314), the controller controls the at least one energy source to fuse the portion of the build layer (block 316). As will be appreciated, the controller may repeat the example operations of flowchart 300 for each layer of a three-dimensional object to be formed to thereby generate the three-dimensional object.

FIGS. 7A-B provide flowcharts that illustrate example sequences of operations that may be performed by an example apparatus and a controller thereof to pre-fuse a portion of a layer of build material. As shown in the example flowchart 350 of FIG. 7A, the apparatus may move a scanning carriage along a scanning axis at a first scanning speed (block 352). The apparatus may emit energy with an energy source during movement of the scanning carriage (block 354). In the flowchart 400 of FIG. 7B, the controller may control a scanning carriage to move along a scanning axis at a first scanning speed (block 402). The controller may control an energy source to emit energy during movement of the scanning carriage (block 404).

As will be appreciated, in FIGS. 7A-B, a scanning carriage is moved at a first scanning speed to facilitate pre-fusing a portion of a build layer. In such examples, the first scanning speed corresponds to a speed at which the scanning carriage may be moved over the build area. In some examples, the first scanning speed may be referred to as a pre-fusing speed. Due to the movement of the scanning carriage at the first scanning speed, an amount of energy may be applied by an energy source on locations of the build area. As will be appreciated, the amount of energy applied upon the locations of the build area may cause portions of the build layer upon which agent was distributed to pre-fuse. In some examples, the first scanning speed may be within a range of approximately 20 inches/second to approximately 40 inches/second (which is approximately 50.8 centimeters/second to approximately 101.6 centimeters/second).

However, it will be appreciated that a speed at which the scanning carriage is moved over a build area is based at least in part on an amount of energy emitted by an energy source and a corresponding amount of energy that is applied to locations of a build layer in the build area. In turn, a first scanning speed may be based at least in part on energy emission characteristics of an energy source implemented for performance of pre-fusing. Accordingly, in some examples, a first scanning speed may be greater than or less than the example speed values of the approximate range.

FIGS. 8A-B provide flowcharts that illustrate example sequences of operations that may be performed by an example apparatus and a controller thereof to fuse a portion of a layer of build material. As shown in the example flowchart 450 of FIG. 8A, the apparatus may move a scanning carriage along a scanning axis at a second scanning speed (block 452). The apparatus may emit energy with an energy source during movement of the scanning carriage (block 454). In the flowchart 500 of FIG. 8B, the controller may control a scanning carriage to move along a scanning axis at a second scanning speed (block 502). The controller may control an energy source to emit energy during movement of the scanning carriage (block 504).

As will be appreciated, in FIGS. 8A-B, a scanning carriage is moved at a second scanning speed to facilitate fusing a portion of a build layer. In such examples, the second scanning speed corresponds to a speed at which the scanning carriage may be moved over the build area. In some examples, the second scanning speed may be referred to as a fusing speed. Due to the movement of the scanning carriage at the second scanning speed, an amount of energy may be applied by an energy source on locations of the build area. As will be appreciated, the amount of energy applied upon the locations of the build area may cause portions of the build layer upon which agent was distributed to fuse. In some examples, the second scanning speed may be within a range of approximately 12 inches/second to approximately 20 inches/second (which is approximately 30.48 centimeters/second to approximately 50.8 centimeters/second).

However, it will be appreciated that a speed at which the scanning carriage is moved over a build area is based at least in part on an amount of energy emitted by an energy source and a corresponding amount of energy that is applied to locations of a build layer in the build area. In turn, a second scanning speed may be based at least in part on energy emission characteristics of an energy source implemented for performance of fusing. Accordingly, in some examples, a second scanning speed may be greater than or less than the example speed values of the approximate range.

Therefore, example apparatuses and processes described herein facilitate control of operations of a layer-wise additive manufacturing process based at least in part on a build layer temperature of a build layer. Examples described herein may facilitate improved selectivity in apparatuses and methods for generating three-dimensional objects. Furthermore, examples may increase build material recyclability by reducing thermal bleeding in performing pre-fusing and fusing associated operations. Furthermore, examples may improve mechanical strength for objects generated with apparatuses, methods, and processes described herein.

The preceding description has been presented to illustrate and describe examples of the principles described. This description is not intended to be exhaustive or to limit these principles to any precise form disclosed. Many modifications and variations are possible in light of the above disclosure.

The invention claimed is:

1. An apparatus for generating a three-dimensional (3D) object, the apparatus comprising:
a build area;
at least one energy source;
at least one build layer temperature sensor; and
a controller connected to the at least one energy source and the at least one build layer temperature sensor, the controller to:
monitor a temperature of a build layer in the build area, wherein the build layer includes a layer of build material and agent distributed onto the build material,
determine whether the temperature of the build layer has cooled to below a first temperature threshold,
in response to a determination that the temperature of the build layer has cooled to below the first temperature threshold, control the at least one energy source to pre-fuse a portion of the build layer, wherein to pre-fuse is to apply an initial amount of energy to cause the portion of the build layer to start coalescing,
after pre-fusing the portion of the build layer, determine whether the temperature of the build layer has cooled to below a second temperature threshold, wherein the second temperature threshold is higher than the first temperature threshold, and
in response to a determination that the temperature of the build layer has cooled to below the second temperature threshold, control the at least one energy source to fuse the portion of the build layer, wherein to fuse is to apply an additional amount of energy to cause the portion of the build layer to substantially coalesce.

2. The apparatus of claim 1, wherein, to monitor the temperature of the build layer, the controller is further to:
before pre-fusing the portion of the build layer, monitor, with the at least one build layer temperature sensor, the temperature of the build layer to determine whether the temperature of the build layer has cooled to less than the first temperature threshold, and
after pre-fusing the portion of the build layer, monitor, with the at least one build layer temperature sensor, the temperature of the build layer to determine whether the temperature of the build layer has cooled to less than the second temperature threshold.

3. The apparatus of claim 1, further comprising:
a build material distributor to distribute the build material in the build area,
wherein the controller is further to:
prior to controlling the at least one energy source to pre-fuse the portion of the build layer, control the build material distributor to distribute the build material of the build layer in the build area, and
after controlling the at least one energy source to fuse the portion of the build layer, control the build material distributor to distribute the build material for another build layer in the build area.

4. The apparatus of claim 1, further comprising:
an agent distributor to selectively distribute the agent in the build area,
wherein the controller is further to:
prior to controlling the at least one energy source to pre-fuse the portion of the build layer, control the agent distributor to selectively distribute the agent on the build material of the build layer in the build area, and
after controlling the at least one energy source to fuse the portion of the build layer, control the agent distributor to selectively distribute the agent on another build layer in the build area.

5. The apparatus of claim 1, further comprising:
a scanning carriage to move along a scanning axis over the build area, wherein the at least one energy source is coupled to the scanning carriage, and the controller is further to control movement of the scanning carriage along the scanning axis.

6. The apparatus of claim 5, wherein the controller controls the at least one energy source to pre-fuse the portion of the build layer concurrent with controlling movement of the scanning carriage at a first scanning speed in a first direction along the scanning axis, and the controller controls the at least one energy source to fuse the portion of the build layer concurrent with controlling movement of the scanning carriage at a second scanning speed, different from the first scanning speed, in a second direction along the scanning axis.

7. The apparatus of claim 1, further comprising:
a first scanning carriage to move along a first scanning axis over the build area;
a build material distributor coupled to the first scanning carriage, the build material distributor to distribute the build material in the build area as the first scanning carriage moves along the first scanning axis;
a second scanning carriage to move along a second scanning axis over the build area; and
an agent distributor coupled to the second scanning carriage, the agent distributor to selectively distribute the agent onto the build material in the build area as the second scanning carriage moves along the second scanning axis.

8. The apparatus of claim 1, wherein the first temperature threshold is within a range of approximately 80° Celsius to approximately 90° Celsius, and the second temperature threshold is within a range of approximately 85° Celsius to approximately 100° Celsius.

9. A method for an apparatus for generating a three-dimensional object, the method comprising:
monitoring a temperature of a build layer in a build area of the apparatus with at least one build layer temperature sensor, wherein the build layer is a layer including build material and agent in which the agent is distributed onto the build material;
determining whether the temperature of the build layer has cooled to less than a first temperature threshold;
in response to a determination that the temperature of the build layer has cooled to less than the first temperature threshold, pre-fusing a portion of the build layer with at least one energy source, wherein the pre-fusing includes applying an initial amount of energy from the at least one energy source to cause the portion of the build layer to start coalescing;
after pre-fusing the portion of the build layer, monitoring the temperature of the build layer to determine whether the temperature of the build layer has cooled to less than a second temperature threshold, wherein the second temperature threshold is higher than the first temperature threshold; and
in response to a determination that the temperature of the build layer has cooled to less than the second temperature threshold, fusing the portion of the build layer with the at least one energy source, wherein the fusing includes applying an additional amount of energy from the at least one energy source to cause the portion of the build layer to substantially coalesce.

10. The method of claim 9, further comprising:
prior to pre-fusing the build layer:
distributing the build material of the build layer in the build area with a build material distributor; and
selectively distributing the agent onto the build material in the build area with an agent distributor.

11. The method of claim 9, wherein pre-fusing the portion of the build layer in the build area with the at least one energy source comprises moving the at least one energy source over the build area along a first direction of a scanning axis with a scanning carriage coupled to the at least one energy source while emitting energy from the at least one energy source, and
wherein fusing the portion of the build layer in the build area with the at least one energy source comprises moving the at least one energy source over the build area along a second direction of the scanning axis with the scanning carriage while emitting energy from the at least one energy source.

12. An apparatus for generating a three-dimensional object, the apparatus comprising:
an energy source; and
a controller to:
monitor a temperature of a build layer in a build area of the apparatus to determine when the temperature has cooled to less than a first temperature threshold, wherein the build layer is a layer of build material and agent in which the agent is distributed onto the build material,
in response to a determination that the temperature has cooled to less than the first temperature threshold, control the energy source to pre-fuse a portion of the build layer in the build area, wherein to pre-fuse is to apply an initial amount of energy from the energy source to cause the portion of the build layer to start coalescing,
after pre-fusing the portion of the build layer, determine whether the temperature of the build layer has cooled to less than a second temperature threshold, wherein the second temperature threshold is higher than the first temperature threshold, and
in response to a determination that the temperature of the build layer has cooled to less than the second temperature threshold, control the energy source to fuse the portion of the build layer, wherein to fuse is to apply an additional amount of energy from the energy source to cause the portion of the build layer to substantially coalesce.

13. The apparatus of claim 12, further comprising:
a build material distributor; and
an agent distributor,
wherein the controller is further to:
prior to pre-fusing the portion of the build layer in the build area, create the build layer in the build area, including controlling the build material distributor to distribute the build material in the build area, and controlling the agent distributor to selectively distribute the agent onto the build material in the build area.

14. The apparatus of claim 12, wherein the first temperature threshold and the second temperature threshold are based at least in part on material properties of the build material of the build layer.

15. The apparatus of claim 12, further comprising:
at least one build layer temperature sensor connected to the controller; and
a build material support having a surface that corresponds to the build area.

16. The apparatus of claim 6, wherein the first scanning speed for the at least one energy source to pre-fuse the portion of the build layer is greater than the second scanning speed for the at least one energy source to fuse the portion of the build layer.

17. The method of claim 9, further comprising:
moving a scanning carriage that includes the at least one energy source over the build area in a first direction along a scanning axis at a first scanning speed for the at least one energy source to pre-fuse the portion of the build layer; and
moving the scanning carriage that includes the at least one energy source over the build area in a second direction along the scanning axis at a second scanning speed for the at least one energy source to fuse the portion of the build layer.

18. The method of claim 17, wherein the first scanning speed for the at least one energy source to pre-fuse the portion of the build layer is greater than the second scanning speed for the at least one energy source to fuse the portion of the build layer.

* * * * *